United States Patent [19]

Ogino et al.

[11] Patent Number: 5,658,988
[45] Date of Patent: Aug. 19, 1997

[54] RESINOUS COMPOSITION FOR COATING

[75] Inventors: Shinichi Ogino; Nobushige Numa; Shinji Tomita; Hajime Sukejima, all of Hiratsuka, Japan

[73] Assignee: Kansai Paint Co., Ltd., Hyogo, Japan

[21] Appl. No.: 496,481

[22] Filed: Jun. 29, 1995

[30] Foreign Application Priority Data

Jun. 30, 1994 [JP] Japan .................. 6-181699
Jun. 30, 1994 [JP] Japan .................. 6-181700
Jun. 30, 1994 [JP] Japan .................. 6-181701

[51] Int. Cl.$^6$ .................. C08L 43/04; C08L 83/06
[52] U.S. Cl. .................. 525/102; 525/100; 525/103; 525/125; 525/123; 525/209; 428/422.8; 428/447; 428/500
[58] Field of Search .................. 525/107, 100, 525/102, 125, 209; 428/422.8, 447, 500

[56] References Cited

U.S. PATENT DOCUMENTS

| | | | |
|---|---|---|---|
| 4,367,313 | 1/1983 | Rizk et al. | 525/102 |
| 5,026,793 | 6/1991 | Nakai et al. | 525/476 |
| 5,166,265 | 11/1992 | Nakahata et al. | 525/101 |
| 5,304,623 | 4/1994 | Ito et al. | 528/28 |

FOREIGN PATENT DOCUMENTS 1-096264  4/1989  Japan .
3-250016  11/1991  Japan .
2 197 325  5/1988  United Kingdom .

OTHER PUBLICATIONS

WPI Abstract No. 90-207242/27 (Dainippon) Apr. 29, 1990.

*Primary Examiner*—Ralph H. Dean
*Attorney, Agent, or Firm*—Foley & Lardner

[57] ABSTRACT

A one-package resinous coating composition, especially for automobile finishes (A) a resin having a siloxy group, and (B) a catalyst for dissociating the siloxy group. Resinous mixture (A) contains one or more of the following (A-1) through (A-4). (A-1) a mixture of (a) a resin that contains at least one siloxy group and one alkoxysilyl group respectively in the one molecule, and (b) a resin that contains at least one isocyanate group and one alkoxysilyl group respectively in the one molecule; (A-2) a mixture of (a) a resin that contains at least one siloxy group and one alkoxysilyl group respectively in the one molecule, and (c) a compound or a resin that contains at least two isocyanate groups in the one molecule; (A-3) a mixture of (b) a resin that contains at least one isocyanate group and one alkoxysilyl group respectively in the one molecule, and (d) a compound or a resin that contains at least two siloxy groups in the one molecule; and (A-4) (e) a resin that contains at least one siloxy group, one isocyanate group and one alkoxysilyl group respectively in the one molecule.

25 Claims, No Drawings

RESINOUS COMPOSITION FOR COATING

BACKGROUND OF THE INVENTION

The present invention relates to a resinous composition for coating applications, and more particularly relates to a multicomponent resinous coating composition that comprises a curing system that contains hydroxyl groups protected in the form of siloxy groups and contains isocyanate group, in which system alkoxysilyl groups are introduced. The resinous compositions according to the present invention are suitable for use in refinishing automobiles.

At the present time, in the field of refinishing of automobiles, two-package coatings have been widely used that are composed of the combination of an acrylic polyol and a multifunctional isocyanate curing agent to provide room temperature setting property, desired finish, and weatherability characteristices. However, the two-package types have problems such as poor practicable application because of the necessity of blending the main agent and curing agent in the place of the coating operation, the influence of too much or too little blend ratio of the curing agent reflected in the coating performance, and the necessity of a large amount of diluting solvent because of the high viscosity of the base resin due to the hydrogen bond of hydroxyl groups. For the purpose of overcoming these problems, one-package resinous compositions using a vinyl polymer that contains siloxy groups, in place of a vinyl polymer that contains hydroxyl groups, and a multifunctional isocyanate curing agent have been proposed (for example, Japanese Laid-open Patent Nos. 3-250016/1991 and 1-96264/1989). However, such resinous compositions are insufficient for curability at room or lower temperature and cannot satisfy the requirement of refinishing automobiles where quick drying is necessary Furthermore, improvement of the acid resistance has been required recently since the coating damage by acid rain has become a problem. The system mentioned above combining hydroxyl groups or siloxy groups with a multifunctional isocyanate curing agent has insufficient acid resistance and does not perform satisfactorily.

SUMMARY OF THE INVENTION

The present invention Seeks to overcome these problems and develop a resinous composition that is a one-package type with a low viscosity and excellent storability, low temperature curing, and acid resistance. It has been found that the use of a resinous composition is very effective which has an alkoxysilyl group introduced into one or both of a resin containing a siloxy group and a resin containing an isocyanate group, or a resin containing a siloxy group, an isocyanate group and an alkoxysilyl group all together.

Thus, according to the present invention, a resinous composition for coating is provided that contains, as essential components, (A) a resin content selected from one or more of the following (A-1) through (A-4) and (B) a catalyst for dissociating the siloxy group:

(A-1) being a mixture of (a) a resin that contains at least one siloxy group and one alkoxysilyl group respectively in the one molecule, and (b) a resin that contains at least one isocyanate group and one alkoxysilyl group respectively in the one molecule;

(A-2) being a mixture of (a) a resin that contains at least one siloxy group and one alkoxysilyl group respectively in the one molecule, and (c) a compound or a resin that contains at least two isocyanate groups in the one molecule;

(A-3) being a mixture of (b) a resin that contains at least one isocyanate group and one alkoxysilyl group respectively in the one molecule, and (d) a compound or a resin that contains at least two siloxy groups in the one molecule; and (A-4) being (e) a resin that contains at least one siloxy group, one isocyanate group and one alkoxysilyl group respectively in the one molecule.

In the present invention, the siloxy group is represented by the following formula (I):

Formula (I):

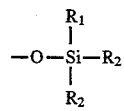

where $R_1$, $R_2$ and $R_3$ may be identical or different and represent an alkyl, phenyl or allyl group having 1 through 18 carbon atoms, and the alkoxysilyl group is represented by the following formula (II):

Formula (II):

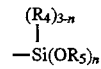

where, $R_4$ represents an alkyl or phenyl group having 1 through 6 carbon atoms, $R_5$ represents an alkyl or alkoxyallyl group, and n is 2 or 3.

In the present invention, the (a) resin that contains at least one siloxy group and one alkoxysilyl group respectively in the one molecule is usually obtained by copolymerizing a vinyl monomer having respective reactive functional groups and the other vinyl monomer able to copolymerize therewith in the presence of a radical polymerization initiator by a conventional solution polymerization or other conventional procedure.

Typical examples of the vinyl monomers that contain the siloxy group mentioned above include trialkylsiloxyakyl acrylates such as: trimethylsiloxyethyl acrylate, trimethylsiloxypropyl acrylate, trimethylsiloxybutyl acrylate, triethylsiloxyethyl acrylate, triethylsiloxypropyl acrylate and triethylsiloxybutyl acrylate; or include trialkylsiloxyakyl methacrylates such as: trimethylsiloxyethyl methacrylate, trimethylsiloxypropyl methacrylate, trimethylsiloxybutyl methacrylate, triethylsiloxyethyl methacrylate, triethylsiloxypropyl methacrylate and triethylsiloxybutyl methacrylate.

However, the vinyl monomers that contain the siloxy group are not limited to these and may be any compounds in which the hydroxyl group in vinyl monomers containing a hydroxyl group is converted to a siloxy group by a known conventional agent for converting to a siloxy group (silylation agent).

For example, a compound in which hydroxyethyl acrylate or hydroxyethyl methacrylate is added with ε-caprolactone and compounds in which polyoxyalkylene glycol acrylates or polyoxyalkylene glycol methacrylates are converted to those having a siloxy group respectively by a silylation agent such as trimethylchlorosilane or t-butyldimethylchlorosilane may be used.

Typical examples of the vinyl monomers that contain the alkoxysilyl group mentioned above include vinyltrimethoxysilane, vinyltriethoxysilane, γ-acryloyloxybutoxypropyltrimethoxysilane, γ-acryloyloxypropyldimethoxymethylsilane, γ-acryloyloxypropyltriethoxysilane, γ-methacryloyloxybutoxypropyltrimethoxysilane, γ-methacryloyloxypropyldimethoxymethylsilane, γ-methacryloyloxypropyltriethoxysilane, styrylethyltrimethoxysilane, vinyltris(2-methoxyethoxy)silane, and vinyltriacetoxysilane.

Typical examples of the other vinyl monomers that are able to copolymerize with the vinyl monomers that have the functional group mentioned above include: vinylaromatic compounds such as styrene, α-methylstyrene, vinyltoluene and chlorostyrene; alkyl esters or cycloalxyl esters having 1 through 24 carbon atoms such as methylacrylate, ethylacrylate, n-propylacrylate, isopropylacrylate, (n-, i-, t-)butylacrylates, n-octylacrylate, 2-ethylhexylacrylate, n-octylacrylate, decylacrylate, laurylacrylate, stearylacrylate, and cyclohexylacrylate; methylmethacrylate, ethylmethacrylate, n-propyl methacrylate, isopropyl methacrylate, (n-, i-, t-)butyl methacrylates, n-octyl methacrylate, 2-ethylhexyl methacrylate, n-octyl methacrylate, decyl methacrylate, lauryl methacrylate, stearyl methacrylate, and cyclohexyl methacrylate; alkoxyalkyl esters having 2 through 18 carbon atoms such as methoxybutyl acrylate, methoxyethyl acrylate, ethoxybutyl acrylate, methoxybutyl methacrylate, methoxyethyl methacrylate and ethoxybutyl methacrylate; perfluoroalkyl acrylates such as perfluorobuthylethyl acrylate, perfluoroisononylethyl acrylate and perfluorooctylethyl acrylate; perfluoroalkyl methacrylates such as perfluorobuthylethyl methacrylate, perfluoroisononylethyl methacrylate and perfluorooctylethyl methacrylate; fluoroolefins represented by the general formula $CX_2=CX_2$ (where, X is identical or independent and represents H, Cl, Br, F, an alkyl group or a haloalkyl group, but at least one F atom is included in the formula) such as $CF_2=CF_2$, $CHF=CF_2$, $CH_2=CF_2$, and $CClF=CF_2$; and so-called macromonomers that are polymers of one or more of these monomers and have a copolymerizable double bond at one end. Single monomers or a mixture of two or more of these monomers may be selected depending on the desired property.

Examples of the solvents that are used in the solution polymerization of the mixture of the monomers mentioned above include: derivatives of alkyl benzenes such as benzene, toluene and xylene; acetate solvents such as ethyl acetate, propyl acetate, amyl acetate, methoxybutyl acetate, acetomethyl acetate, acetoethyl acetate, methyl cellosolve acetate, cellosolve acetate, diethylene glycol acetate monomethyl ether, and carbitol acetate; ether solvents such as dioxane, ethylene glycol diethyl ether, ethylene glycol dibutyl ether, and diethylene glycol diethyl ether; and ketone solvents such acetone, methyl ethyl ketone, and methyl isobutyl ketone. Single solvents or a mixture of two or more of these solvents may be used.

Examples of the radical polymerization initiators include: peroxides such as benzoyl peroxide, di-t-butyl hydroperoxide, t-butyl hydroperoxide, cumyl peroxide, cumene hydroperoxide, diisopropylbenzene hydroperoxide, t-butyl-oxybenzoate, lauryl peroxide, acetyl peroxide, and t-butylperoxy-2-ethylhexanoate; and azo compounds such α, α'-azobisisobutyronitrile, α, α'-azobis-2-methylbutyronitrile, azobisdimethylvaleronitrile, and azobiscyclohexanecarbonitrile.

The suitable ratios to be used of the respective monomers mentioned above can be: 5 through 99%, preferably 10 through 60%, by weight of a vinyl monomer that contains a siloxy group, 1 through 95%, preferably 3 through 40%, by weight of a vinyl monomer that contains an alkoxysilyl group, and 0 through 94%, preferably 0 through 87%, by weight of the other vinyl monomer.

The resin (a) that is obtained by an ordinary radical solution polymerization using the vinyl monomers, solvent, and polymerization initiator mentioned above is preferred to have a weight average molecular weight in the range of 1,000 through 200,000, more preferably 2,000 through 100,000. If the weight average molecular weight is smaller than 1,000, satisfactory quick drying can hardly be attained, and the weatherability and durability of resulting coating tend to be lowered; on the other hand, if the molecular weight exceeds 200,000, the appearance of the finish can deteriorate. Thus molecular weights out of the specified ranges are generally undesirable.

The resin (b) in the present invention contains at least one isocyanate group and one alkoxysilyl group respectively in the one molecule. Resin (b) is usually obtained by copolymerizing a vinyl monomer having respective reactive functional groups and the other vinyl monomer able to copolymerize with these monomers in the presence of a radical polymerization initiator by a conventional solution polymerization, as is the case for the resin (a) mentioned above.

Typical examples of the vinyl monomers that contain the isocyanate group mentioned above include isocyanate ethylacrylate, isocyanate propylacrylate, isocyanate ethylmethacrylate, isocyanate propylmethacrylate, and metaisopropenyl-α,α'-dimethylbenzyl isocyanate. However, the vinyl monomers that contain the isocyanate group are not limited to these and may be adducts of vinyl monomers containing a hydroxyl group with multifunctional compounds such as isophorone diisocyanate.

The vinyl monomer that Contains an alkoxysilyl group and the other vinyl monomer able to copolymerize with these vinyl monomers having reactive functional groups mentioned above may be selected suitably from those listed as the constituent moieties for the resin (a).

The suitable ratios to be used of the respective monomers in the resin (b) are: 5 through 99%, preferably 10 through 60%, by weight of a vinyl monomer that contains an isocyanate group, 1 through 95%, preferably 3 through 40%, by weight of a vinyl monomer that contains an alkoxysilyl group, and 0 through preferably 0 through 94%, preferably 0 through 87%, by weight of the other vinyl monomer.

The resin (b) preferably has a weight average molecular weight in the range of 1,000 through 200,000, more preferably 2,000 through 100,000. If the weight average molecular weight is smaller than 1,000, satisfactory quick drying can barely be achieved, and the weatherability and durability of resulting the coating tend to be lower. On the other hand, if the molecular weight exceeds 200,000, the appearance of the finish may deteriorate. Thus molecular weight out of the specified ranges are generally undesirable.

The compound (c) contains at least two isocyanate groups in the one molecule, and may be a resin that further contains at least one siloxy group depending on the case.

Typical examples of the compounds that contain at least two isocyanate groups in the one molecule and are used as the above compound (c) include: aliphatic diisocyanates such as hexamethylene diisocyanate and trimethylhexamethylene diisocyanate; alicyclic diisocyanates such as hydrogenated xylene diisocyanate and isophorone diisocyanate; and aromatic diisocyanates such tolylene diisocyanate and 4,4'-diphenylmethane diisocyanate. These organic diisocyanates mentioned above by themselves, adducts of these organic diisocyanates with polyhydric alcohols, adducts of these organic diisocyanates with polyesters of low molecular weight, adducts of these organic diisocyanates with water, mutual cyclic polymerization products of these organic diisocyanates, and the isocyanate-biuret products, may be used as the compound (c). Typical commercial products of these include: Burnock D-750, -800, DN-950, -970 and 15-455 manufactured by Dainippon Ink and Chemicals, Inc.; Desmodur L, N, HL, IL, and N3390 manufactured by Bayer AG, Germany; Sumidur N-3200 and N-3500 manufactured by Sumitomo Bayer Urethane Company; Takenate D-102, -202, -110N and 123N manufactured by Takeda Chemical Industries, Ltd.; Coronate L, HL, EH, and 203 manufactured by Nippon Polyurethane Industry Co., Ltd.; and Duranate 24A-90CX manufactured by Asahi Chemical Industry Co., Ltd.

The resin used as the (c) component mentioned above is usually obtained by copolymerizing a vinyl monomer having an isocyanate group, the other vinyl monomer able to copolymerize therewith, and a vinyl monomer containing a hydroxyl group if required, in the presence of a radical polymerization initiator by a conventional polymerization such as solution polymerization, as is the case for the resin (a) mentioned above.

The compound (d) in the present invention is a compound or a resin that contains two siloxy groups in the one molecule, and may be a resin further containing at least one isocyanate group.

The compound used as the component (d) mentioned above may be one of any compounds that are prepared by converting the hydroxyl groups of a compound having at least two hydroxyl groups in the one molecule to siloxy groups using a known conventional silylation agent. Typical examples of these compounds include: dihydric alcohols such as ethylene glycol, propylene glycol, 1,2-butanediol, 1,3-butanediol, and 2,3-butanediol; polylactonediols that are adducts of these dihydric alcohols with a lactone such as ε-caprolactone; polyhydric alcohols higher than trihydric such as glycerin, trimethylolpropane, and pentaerythritol; and compounds that are prepared by converting these polyhydric alcohols higher than trihydric to siloxy groups using a silylation agent such as trimethylchlorosilane or t-butyldimethylchlorosilane. Furthermore, the component (d) mentioned above may be a resin that is obtained by copolymerizing the vinyl monomer containing a siloxy group listed in the description of (a) above with a vinyl monomer such as styrene, an acrylate or a methacrylate and, if required, a vinyl monomer containing an isocyanate group.

Resin (e) in the present invention contains at least one siloxy group, one isocyanate group and one alkoxysilyl group respectively in the one molecule, and is usually obtained by copolymerizing a vinyl monomer having these respective functional groups and the other vinyl monomer able to copolymerize therewith in the presence of a radical polymerization initiator by a conventional solution polymerization or other type of polymerization, as is the case for the resin (a) mentioned above.

The vinyl monomer, mentioned above, containing siloxy, isocyanate and alkoxysilyl groups respectively, and the other vinyl monomer able to copolymerize with such vinyl monomer containing these functional groups may be selected suitably from those vinyl monomers containing respective functional groups and the other vinyl monomers listed as the constituent moieties for the resins (a) and (b) mentioned above.

The suitable ratios to be used of respective monomers in the resin (e) are: 5 through 60% by weight of a vinyl monomer that contains a siloxy group, 5 through 60% by weight of a vinyl monomer that contains an isocyanate group, 1 through 40% by weight of a vinyl monomer that contains an alkoxysilyl group, and 0 through 89% by weight of the other vinyl monomer.

The resin (e) preferably has a weight average molecular weight in the range of 1,000 through 200,000, more preferably 2,000 through 100,000. If the weight average molecular weight is smaller than 1,000, satisfactory quick drying can hardly be achieved, and the weatherability and durability of the resulting coating tend to be lower. On the other hand, if the molecular weight exceeds 200,000, the appearance of the finish can deteriorate. Thus molecular weight out of the specified ranges are generally undesirable.

As described hereinabove, the resinous constituent of the present invention is selected from at least one of: (A-1) a mixture of the resin (a) and resin (b); (A-2) a mixture of the resin (a) and compound (c); (A-3) a mixture of the resin (b) and compound (d); and (A-4) the resin (e) only.

While one of the above resinous constituents (A-1) through (A-4) is sufficient, one or more of (f) resins that contain two kinds of the functional groups respectively selected from a siloxy group, an isocyanate group and an alkoxysilyl group in the one molecule, and/or one or more of (g) compounds that contain two or more of one kind of functional group selected from a siloxy group, an isocyanate group, and an alkoxysilyl group in the one molecule may be added to the above resinous constituents (A-1) through (A-4) if required.

Usable resins as the mentioned resin (f) are what are prepared by copolymerizing, in a conventional process explained above, two kinds of vinyl monomers selected from those having respective functional groups listed as the constituent moieties for the resins (a) and (b) mentioned above.

As the compound usable for the constituent (g) that contains at least two of the siloxy groups or isocyanate groups in the one molecule, the compound or resin listed in the description of the compounds (c) and (d) may be listed.

The compound usable for the constituent (g) that contains at least two alkoxysilyl groups in the one molecule may be prepared by copolymerizing a vinyl monomer that contains an alkoxysilyl group listed in the description of the resin (a) with another vinyl monomer such as styrene, an acrylate or a methacrylate.

The resins (a), (b), (e) and (f) mentioned above may be used with a type of non aqueous dispersion (NAD), where these resins function as the dispersion stabilizer.

Respective resins and compounds in the resinous constituents described above (including (f) and (g) when used as required) may be blended in suitably selected ratios depending on the contents of the reactive functional groups in the resin compositions.

The content of the alkoxysilyl groups in the composition of the present invention is, as the vinyl monomers used that have the alkoxysilyl groups and as the compounds used that have the alkoxysilyl groups, preferably corresponds to 1 through 40%, more preferably 3 through 30%, by weight of the whole solid content in the resinous composition; if the alkoxysilyl groups are less than 1% by weight, the curing at lower temperatures is insufficient and the acid resistance tends to be poor; and if the alkoxysilyl groups exceed 40% by weight, the cured coating tends to be brittle.

The content of the siloxy groups in the composition of the present invention is, as the vinyl monomers used that have the siloxy groups and as the compounds used that have the siloxy groups, preferably corresponds to 5 through 60%, more preferably 10 through 50%, by weight of the whole solid content in the resinous composition. If the siloxy groups are less than 10% by weight, the cross-linking density becomes low and the physical properties of the film tend to be poor; and if the alkoxysilyl groups exceed 50% by weight, the performance does not improve any further.

The siloxy groups in the composition of the present invention are hydrolyzed by moisture in air after the coating operation and form hydroxyl groups. In this regard, the amount of the vinyl monomers containing isocyanate groups and the compounds containing isocyanate groups in the composition preferably falls into a range of NCO/OH=0.5 through 2.0 as the equivalent ratio in terms of the isocyanate groups and the hydroxyl groups formed from the siloxy groups in the whole resinous composition.

The siloxy groups in the composition of the present invention are hydrolyzed by moisture in air after the coating is applied to the surface to be finished and form hydroxyl groups. In order to accelerate this hydrolysis reaction, a catalyst (B) for dissociating the siloxy groups is the essential component. Typical examples of the catalyst that dissociates the siloxy groups are acidic compounds including; phosphoric acid and its acidic esters, and phosphorous esters; sulfonic acids such as para-toluenesulfonic acid and naphthalenedisulfonic acid, and their amine salts; and carboxylic acids such as trichloroacetic acid and trifluoroacetic acid, and their salts. When the composition according to the present invention is stored for a considerable period of time, the catalyst and the resinous constituents are preferably stored in separate containers.

The amount of the catalyst (B) for dissociating the siloxy groups to be added is preferably in the range of 0.01 through 10%, more preferably 0.1 through 5%, by weight of the solid content in the resinous composition. If the amount is less than 0.1% by weight, or if the amount is more than 10% by weight, the coating tends to deteriorate.

For the purpose of accelerating the reaction of the formed hydroxyl groups and isocyanate groups further, a known conventional catalyst for converting to urethanes such as an organic tin compound (e.g., dibutyltin dilauriate) may be added preliminarily to the composition of the present invention depending on the resinous constituent and the catalyst for dissociation.

Furthermore, a moisture-coupling agent that catches hold of moisture may be added to the composition of the present invention for preventing the hydrolysis of siloxy groups and improving the storability for a long period. Examples of the moisture-coupling agent include: trialkylorthoformic acids such as trimethylorthoformic acid, triethylorthoformic acid, and tributylorthoformic acid; trialkylorthoacetic acids such as trimethylorthoacetic acid, triethylorthoacetic acid, and tributylorthoacetic acid; and monoisocyanate compounds such as phenyl isocyanate, p-chlorophenyl isocyanate, and p-toluenesulfonyl isocyanate. For example, a commercial product "Additive TI" manufactured by Sumitomo Bayer Urethane Company may be used.

Furthermore, a cellulose resin such as cellulose acetate butyrate and an epoxy resin may be used in blending for improving the physical properties. In addition, additives for coating may be contained if required such as a pigment (for example, metallic pigment such as aluminum paste, pearl powder, graphite, and MIO; organic and inorganic color pigments such as titanium oxide and carbon black; and an extender), organic solvents, ultraviolet ray absorbers, antioxidants, surface modifiers, and dispersants.

The composition according to the present invention thus obtained is usable as a one-package coating that can be applied just after adjusting the viscosity for the coating.

The method for coating the composition of the present invention may be any known method in the field of coating such as spray coating, brushing, and roller coating. Normally, the dry coating thickness ranges from 10 through 80 μm, preferably 20 through 50 μm.

The composition according to the present invention is: a multicomponent composition consisting of a resin that contains a siloxy group, alkoxysilyl group and isocyanate group, and a compound and/or resin that contains one or two of these reactive functional groups; a one-package coating of low viscosity excellent in storability, low temperature curing, and acid resistance; and a very useful resinous composition for coating in the field of the finish of automobiles in particular. For example, in a finish coating comprising applying a base coat that contains a metallic pigment and/or color pigment and then applying a clear coating, the resinous composition for coating according to the present invention can be used as the clear coating. The clear coating is formed over top of the paint on the metal substrate.

Now, the present invention is illustrated more specifically by way of the following examples.

Production of Resins Containing Reactive Functional Groups

PRODUCTION EXAMPLE 1

A thermometer, thermostat, agitator, reflux condenser, and pump for dripping were fitted to a reactor. Xylene in an amount of 60 parts by weight was charged into the reactor and heated to 110° C. while agitating. Then, 102.2 parts by weight of a mixture consisting of the monomers and polymerization initiator shown in Table 1, kept at 110° C., was dripped in over 3 hours at a constant rate using the pump for dripping. After completing the dripping, the content was kept at 110° C. while agitation was continued. Thereafter, 0.5 parts by weight of the additional polymerization initiator dissolved in 5 parts by weight of xylene was dripped in over 1 hour at a constant rate. The mixture was kept 110° C. for additional 1 hour to complete the reaction. The resultant resinous solution containing siloxy groups and alkoxysilyl groups was a uniform and clear solution of Gardner viscosity R, having 60% by weight of non-volatile matter. The weight average molecular weight of this resin was 18,000.

PRODUCTION EXAMPLES 2–19

Production Example 1 was repeated except the ratios of the mixture of the monomers and polymerization initiator and the additional polymerization initiator were as shown Table 1. Values for the property of the product resin and resinous solution are as shown in Table 2.

TABLE 1

| | Production Example | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Styrene | 15 | 20 | 20 | 20 | | 10 | 10 | 20 | 25 | 15 | 25 | 10 | 30 | 25 | 30 | | 20 | 30 | 20 |
| n-Butyl methacrylate | 10 | 10 | 10 | | 10 | 10 | 15 | | 10 | 10 | | | 15 | 15 | 35 | 30 | 30 | | 10 |
| i-Butyl methacrylate | | 10 | 25 | 30 | 30 | 20 | 20 | 20 | 20 | 15 | | 35 | | 25 | | 15 | 30 | 25 | 50 |
| t-Butyl methacrylate | 30 | 30 | 5 | 15 | 30 | 20 | 20 | | | | 20 | 10 | 30 | | 30 | | | | |

TABLE 1-continued

| | Production Example | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| 2-Ethylhexyl methacrylate | 5 | | 5 | | | 5 | 5 | | 5 | 10 | | 5 | 10 | 5 | | | 10 | | |
| Trimethylsiloxyethyl methacrylate | 30 | 20 | 30 | 20 | | | | 30 | 25 | 25 | 20 | 25 | | | 30 | 25 | | | |
| Isocyanate ethyl methacrylate | | | | | 20 | 20 | 20 | 25 | 20 | 20 | 15 | 20 | | 25 | | | | | |
| Hydroxyethyl methacrylate | | | | | | | | | | | | | | | | | | 20 | 20 |
| γ-Methacryloyl oxyptopyltrimetoxysilane | 10 | 10 | 10 | 10 | 10 | 20 | 10 | | | 10 | 10 | | 20 | | | | 20 | 15 | |
| Polymerixation initiator | 2.2 | 5.0 | 3.0 | 5.0 | 3.0 | 2.5 | 5.0 | 3.0 | 2.5 | 2.2 | 5.0 | 3.0 | 3.5 | 3.5 | 3.5 | 3.0 | 3.0 | 7.0 | 7.0 |
| Additional polymerization initiator | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

Polymerization initiator: α,α'-azobis-2-methylbutyronitrile
Additional polymerization initiator: α,α'-azobis-2-methylbutyronitrile

TABLE 2

| | Production Example | | | | | | | | | |
|---|---|---|---|---|---|---|---|---|---|---|
| | 1 | 2 | 3 | 4 | 5 | 6 | 7 | 8 | 9 | 10 |
| Non-volatile matter (%) | 60 | 60 | 60 | 60 | 60 | 60 | 60 | 60 | 60 | 60 |
| Gardner viscosity | R | H | MN | I | NO | OP | FG | MN | R | O |
| Weight average molecular weight | 18,000 | 12,000 | 15,000 | 12,000 | 15,000 | 17,000 | 12,000 | 15,000 | 17,000 | 18,000 |
| Tg(°C.) | 64 | 69 | 56 | 60 | 59 | 50 | 52 | 63 | 64 | 48 |

| | Production Example | | | | | | | | |
|---|---|---|---|---|---|---|---|---|---|
| | 11 | 12 | 13 | 14 | 15 | 16 | 17 | 18 | 19 |
| Non-volatile matter (%) | 60 | 60 | 60 | 60 | 60 | 60 | 60 | 60 | 60 |
| Gardner Viscosity | GH | P | N | L | LH | MN | L | Z3 | Z2Z3 |
| Weight average molecular weight | 12,000 | 15,000 | 14,000 | 14,000 | 14,000 | 15,000 | 15,000 | 9,000 | 10,000 |
| Tg(°C.) | 62 | 67 | 57 | 52 | 52 | 61 | 36 | 46 | 58 |

WORKING EXAMPLES AND COMPARATIVE EXAMPLES

The resinous solutions containing reactive functional groups obtained in the Production Examples, catalysts, and a polyisocyanate compound (N-3500) are mixed in the ratio shown in Table 3 and agitated to prepare clear coatings.

TABLE 3

| | Working Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Production Example 1 | 90 | | 90 | 55 | 102 | | 72 | 50 | | | | |
| Production Example 2 | | 95 | | | | 45 | | | | | | |
| Production Example 3 | | | | | | | | | 87 | 130 | | 70 |
| Production Example 4 | | | | | | | | | | | 76 | |
| Production Example 5 | | | | | | | | | | | | |
| Production Example 6 | 77 | 72 | | 57 | 57 | 77 | | 51 | | | | |
| Production Example 7 | | | 77 | | | | 62 | | | | | |
| Production Example 8 | | | | 55 | | | | 50 | | | | |
| Production Example 9 | | | | | | | | | | | 76 | |
| Production Example 10 | | | | | | | | | | | | |
| Production Example 11 | | | | | | | | | | | | |
| Production Example 12 | | | | | | | | | | | | |
| Production Example 13 | | | | | | | | | | | | 33 |
| Production Example 14 | | | | | | | | | 80 | | | 64 |
| Production Example 15 | | | | | | | | | | | | |
| Production Example 16 | | | | | | 45 | | | | | | |
| Production Example 17 | | | | | | | 33 | 16 | | | | |

TABLE 3-continued

| | | | | | | | | | | | | |
|---|---|---|---|---|---|---|---|---|---|---|---|---|
| Production Example 18 | | | | | | | | | | | | |
| Production Example 19 | | | | | | | | | | | | |
| N-3500 | | | | | 5 | | | | | 22 | 9 | |
| Dissociation catalyst | 1.0 | 1.0 | 1.0 | 1.0 | 1.0 | 1.0 | 1.0 | 1.0 | 1.0 | 1.0 | 1.0 | 1.0 |
| Urethane preparation catalyst | 0.05 | 0.05 | 0.05 | 0.05 | 0.05 | 0.05 | 0.05 | 0.05 | 0.05 | 0.05 | 0.05 | 0.05 |
| NCO/OH ratio | 1.0 | 1.0 | 1.0 | 1.0 | 1.0 | 1.0 | 1.0 | 1.0 | 1.0 | 1.0 | 1.0 | 1.0 |

| | Working Example | | | | | | | | Comparative Example | | | |
|---|---|---|---|---|---|---|---|---|---|---|---|---|
| | 13 | 14 | 15 | 16 | 17 | 18 | 19 | 20 | 1 | 2 | 3 | 4 |
| Production Example 1 | | | | | | | | | | | | |
| Production Example 2 | | | | | | | | | | | | |
| Production Example 3 | | | | | | | | | | | | |
| Production Example 4 | | | | | | | | | | | | |
| Production Example 5 | 90 | 58 | 26 | | | | | | | | | |
| Production Example 6 | | | | | | | | | | | | |
| Production Example 7 | | | | | | | | | | | | |
| Production Example 8 | | | | | | | | | | | | |
| Production Example 9 | | 58 | | | | | | | | | | |
| Production Example 10 | | | | 167 | | | 134 | 101 | | | | |
| Production Example 11 | | | | | 167 | 134 | | | | | | |
| Production Example 12 | | | | | | 33 | | 34 | | | | |
| Production Example 13 | | | | | | | | | | | | 21 |
| Production Example 14 | | | | | | | | | | | | |
| Production Example 15 | 77 | 51 | 114 | | | | | | | 134 | | 107 |
| Production Example 16 | | | | | | | | | | | | |
| Production Example 17 | | | | | | | 33 | 33 | | | | |
| Production Example 18 | | | | | | | | | | | 128 | |
| Production Example 19 | | | | | | | | | 128 | | | |
| N-3500 | | | 16 | | | | | | 23 | 19 | 23 | 15 |
| Dissociation catalyst | 1.0 | 1.0 | 1.0 | 1.0 | 1.0 | 1.0 | 1.0 | 1.0 | 1.0 | 1.0 | 1.0 | 1.0 |
| Urethane preparation catalyst | 0.05 | 0.05 | 0.05 | 0.05 | 0.05 | 0.05 | 0.05 | 0.05 | 0.05 | 0.05 | 0.05 | 0.05 |
| NCO/OH ratio | 1.0 | 1.0 | 1.0 | 1.0 | 1.0 | 1.0 | 1.0 | 1.0 | 1.0 | 1.0 | 1.0 | 1.0 |

N-3500: Manufactured by Sumitomo Bayer Urethane Company; Non-volatile matter content 100%; NCO content 21.6%; Isocyanurate type of hexamethylene diisocyanante.
Dissociation catalyst: Diisopropylphosphate.
Urethane preparation catalyst: Dibutyltin lauriate.

The resins used are: (A-1) resin in Examples 1–8; (A-2) resin in Examples 9–12; (A-3) resin in Examples 13–15; and (A-4) resin in Examples 16–20.

These clear coatings were subjected to viscosity adjustment to 13–14 seconds (Ford cup #4/25° C.) using a thinner of the composition of: toluene/xylene/ethyl acetate/butyl acetate =50/20/10/20. The adjusted coatings were subjected to spray coating at room temperature (20° C.) on a tin plate or a tin plate that was coated with a clear coating for new car grade and baked. Obtained test coated plates were evaluated for the performance. Table 4 shows the results.

TABLE 4

| | | Working Example | | | | | | | | | | | |
|---|---|---|---|---|---|---|---|---|---|---|---|---|---|
| | | 1 | 2 | 3 | 4 | 51 | 6 | 7 | 8 | 9 | 10 | 11 | 12 |
| Low temperature curing (Gel fraction) | 1 day later | 55 | 51 | 50 | 50 | 51 | 52 | 61 | 57 | 50 | 45 | 48 | 53 |
| | 2 days later | 63 | 59 | 59 | 58 | 60 | 62 | 75 | 64 | 58 | 52 | 56 | 60 |
| | 7 days later | 80 | 78 | 77 | 75 | 78 | 80 | 85 | 83 | 75 | 75 | 76 | 78 |
| Coating hardness (Tukon hardness) | 1 day later | 2.0 | 1.8 | 1.9 | 1.5 | 1.9 | 1.7 | 2.0 | 1.8 | 1.8 | 1.5 | 1.5 | 1.9 |
| | 2 days later | 5.7 | 5.6 | 5.6 | 4.8 | 5.4 | 5.4 | 6.0 | 5.9 | 5.4 | 4.9 | 5.1 | 5.7 |
| | 7 days later | 10.2 | 10.6 | 9.8 | 9.4 | 10.0 | 9.9 | 10.9 | 10.0 | 10.3 | 9.9 | 9.6 | 10.0 |
| Acid resistance | | ◯ | ◯ | ◯ | ◯ | ◯ | ◯ | ◯ | ◯ | ◯ | ◯ | ◯ | ◯ |
| Accelerated weatherbility | | ◯ | ◯ | ◯ | ◯ | ◯ | ◯ | ◯ | ◯ | ◯ | ◯ | ◯ | ◯ |
| Gasoline resistance | | ◯ | ◯ | ◯ | ◯ | ◯ | ◯ | ◯ | ◯ | ◯ | ◯ | ◯ | ◯ |
| Storability | | ◯ | ◯ | ◯ | ◯ | ◯ | ◯ | ◯ | ◯ | ◯ | ◯ | ◯ | ◯ |

TABLE 4-continued

|  |  | Working Example | | | | | | | | Comparative Example | | | |
|---|---|---|---|---|---|---|---|---|---|---|---|---|---|
|  |  | 13 | 14 | 15 | 16 | 17 | 18 | 19 | 20 | 1 | 2 | 3 | 4 |
| Low temperature curing (Gel fraction) | 1 day | 45 | 55 | 43 | 58 | 48 | 45 | 60 | 54 | 65 | 0 | 62 | 0 |
|  | later 2 days | 55 | 62 | 52 | 70 | 65 | 61 | 75 | 68 | 70 | 5 | 68 | 8 |
|  | later 7 days | 77 | 80 | 74 | 83 | 72 | 70 | 86 | 76 | 82 | 72 | 85 | 70 |
|  | later | 1.6 | 1.9 | 1.4 | 2.1 | 1.5 | 1.2 | 2.2 | 1.8 | 0.6 | <0.5 | 0.6 | <0.5 |
| Coating hardness (Tukon hardness) | 1 day later | 5.2 | 5.8 | 4.9 | 6.0 | 4.8 | 4.0 | 6.3 | 6.0 | 2.0 | 0.6 | 2.1 | 0.6 |
|  | 2 days later | 9.4 | 10.1 | 9.2 | 10.5 | 9.5 | 9.0 | 10.9 | 10.3 | 8.1 | 6.1 | 6.0 | 5.0 |
|  | 7 days later |  |  |  |  |  |  |  |  |  |  |  |  |
| Acid resistance |  | ○ | ○ | ○ | ○ | ○ | ○ | ○ | ○ | Δ | Δ | ○ | ○ |
| Accelerated weatherbility |  | ○ | ○ | ○ | ○ | ○ | ○ | ○ | ○ | ○ | ○ | ○ | ○ |
| Gasoline resistance |  | ○ | ○ | ○ | ○ | ○ | ○ | ○ | ○ | ○ | ○ | ○ | ○ |
| Storability |  | ○ | ○ | ○ | ○ | ○ | ○ | ○ | ○ | x | ○ | x | ○ |

The test procedures were as follows:

(1) Low temperature curing:

The coated tin plate was kept horizontally for 20 minutes, then left to standstill in a constant temperature of 5° C. and a constant humidity of 60% RH for 1, 2, and 7 days; the gel fraction of the coating was measured.

Measuring method of gel fraction: The coating was peeled from the test plate; 5.0 g of the coating was put into a Soxhlet's extractor and acetone was allowed to reflux for 6 hours. The gel fraction was determined as the weight retained in the coating after extraction per the weight before extraction.

(2) Coating hardness:

Tukon hardness of the coating prepared in the same way as (1) was measured under the condition of 20° C. by a Tukon harness tester manufactured by American Chain & Cable Company. Higher value means higher hardness.

(3) Acid resistance:

On a coated plate on which a clear coating for new car grade was coated and baked, the clear coating of each Example was coated, baked at 60° C. for 20 minutes, and dried at 20° C. for 7 days. Then on the dried coated plate, 40% sulfuric acid was spotted; and the plate was heated to 85° C. for 30 minutes. Thereafter, the condition of the coated surface was evaluated.

○: Almost no change in the coated surface.

Δ: Etchings.

x: Significant etchings.

(4) Weatherability:

The coated plate prepared in the same way as (3) was subjected to 1000 hours test in a Sunshine Weather-O-meter. Thereafter, the condition of the coated surface was evaluated.

○: Almost no change in the coated surface.

x: Marks of water were observed and the gloss was deteriorated significantly.

(5) Gasoline resistance:

The coated plate prepared in the same way as (3) was fixed horizontally; on the plate, a sheet of gauze folded in four that was impregnated with about 5 ml of regular gasoline was placed for 3 minutes. The gauze was removed thereafter, the gasoline was wiped with another sheet of gauze, and the condition of the coated surface was evaluated.

○: Almost no change in the coated surface.

x: Gloss was deteriorated and softening was observed on the coated surface.

(6) Storability:

Each sample was subjected to viscosity adjustment; the adjusted sample was kept for 7 days in sealed condition at room temperature (20° C.) and the change of viscosity was evaluated.

○: Almost no viscosity change.

Δ: Viscosity was increased somewhat.

x: Significant viscosity increase or gelation was observed.

According to the present invention using a resinous constituent containing a siloxy group, isocyanate group and alkoxysilyl group, a resinous composition for coating of one package type that is of low viscosity, excellent in storability, low temperature curing and acid resistance, and particularly excellent in low temperature curing can be obtained, which has not been obtained by conventional two-package types combining an acrylic polyol with a multifunctional isocyanate curing agent or by conventional one-package types comprising a vinyl monomer that contains a siloxy group and a multifunctional isocyanate curing agent.

Japanese priority application Nos. 6-181699, 6-181700 and 6-181701 filed on June 30, 1994 are relied on herein and incorporated by references.

What is claim is:

1. A resinous composition for coating comprising (A) a resinous mixture comprising a resin having a siloxy group, and (B) a catalyst for dissociating the siloxy group, wherein resinous mixture (A) is selected from one or more of the following (A-1) through (A-4):

(A-1) a mixture of (a) a resin that contains at least one siloxy group and one alkoxysilyl group respectively in the one molecule, and (b) a resin that contains at least one isocyanate group and one alkoxysilyl group respectively in the one molecule;

(A-2) a mixture a (a) a resin that contains at least one siloxy group and one alkoxysilyl group respectively in the one molecule, and (c) a compound or a resin that contains at least two isocyanate groups in the one molecule;

(A-3) a mixture of (b) a resin that contains at least one isocyanate group and one alkoxysilyl group respectively in the one molecule, and (d) a compound or a resin that contains at least two siloxy groups in the one molecule; and (A-4) (e) a resin that contains at least one siloxy group, one isocyanate group and one alkoxysilyl group respectively in the one molecule, wherein the resin (a) is a copolymer of a vinyl monomer that contains a siloxy group, a vinyl monomer that contains an alkoxysilyl group, and optionally another vinyl monomer able to copolymerize with these monomers, wherein the resin (b) is a copolymer of a vinyl monomer that contains an isocyanate group, a vinyl monomer that contains an alkoxysilyl group, and optionally another vinyl monomer able to copolymerize with these monomers, and wherein the resin (e) is a copolymer of at least one of the respective vinyl monomers that contain a siloxy group, an isocyanate group and an alkoxysilyl group respectively, and optionally another vinyl monomer able to copolymerize with these monomers.

2. A resinous composition for coating according to claim 1 wherein the resinous mixture (A) comprises resin (a).

3. A resinous composition for coating according to claim 2 wherein the resin (a) is a copolymer of 5 through 99% by weight of the vinyl monomer that contains a siloxy group, 1 through 95% by weight of the vinyl monomer that contains an alkoxysilyl group, and 0 through 94% by weight of the optional another vinyl monomer.

4. A resinous composition for coating according to claim 1 wherein the resinous mixture (A) comprises resin (a), and the resin (a) is a copolymer having a weight average molecular weight of 1,000 through 200,000.

5. A resinous composition or coating according to claim 1 wherein the resinous mixture (A) comprises resin (b).

6. A resinous composition for coating according to claim 5 wherein the resin (b) is a copolymer of 5 through 99% by weight of the vinyl monomer that contains an isocyanate group, 1 through 95% by weight of the monomer that contains an alkoxysilyl group, and 0 through 94% by weight of the optional another vinyl monomer.

7. A resinous composition for coating according to claim 1 wherein the resinous mixture (A) comprises resin (b), and the resin (b) is a copolymer having a weight average molecule weight of 1,000 through 200,000.

8. A resinous composition for coating according to claim 1 wherein the resinous mixture (A) comprises resin (c), and resin (c) is a copolymer of a vinyl monomer that contains an isocyanate group and another vinyl monomer able to copolymerize with this monomer.

9. A resinous composition for coating according to claim 1 wherein the resinous mixture (A) comprises resin (d), and resin (d) is a copolymer of a vinyl monomer that contains a siloxy group and another vinyl monomer able to copolymerize with this monomer.

10. A resinous composition for coating according to claim 1 wherein the resinous mixture (A) comprises resin (c) or resin (d), and wherein the resin (c) or (d) is a copolymer of a vinyl monomer that contains an isocyanate group, a vinyl monomer that contains a siloxy group, and another vinyl monomer able to copolymerize with these monomers.

11. A resinous composition for coating according to claim 1 wherein the resinous mixture (A) comprises resin (e).

12. A resinous composition for coating according to claim 11 wherein the resin (e) is a copolymer of 5 through 60 by weight of a vinyl monomer that contains a siloxy group, 5 through 60% by weight of a vinyl monomer that contains an isocyanate group, 1 through 40% by weight of a vinyl monomer that contain an alkoxysilyl group, and 0 through 89% by weight of the optional another vinyl monomer.

13. A resinous composition for coating according to claim 1 wherein the resinous mixture (A) comprises resin (e), and the resin (e) is a copolymer having a weight average molecular weight of 1,000 through 200,000.

14. A resinous composition for coating according to claim 1 that further comprises, as a resinous component, one or more of (f) resins that contain two kinds of functional groups respectively selected from a siloxy group, an isocyanate group, and an alkoxysilyl group in the one molecule wherein the resin (f) is a copolymer of two kinds of the monomers selected from a vinyl monomer that contains a siloxy group, a vinyl monomer that contains an isocyanate group, and a vinyl monomer that contains an alkoxysilyl group, and another vinyl monomer able to copolymerize with these monomers.

15. A resinous composition for coating according to claim 1 that further comprises, as a resinous component, one or more of (g) compounds or resins that contain two or more of one kind of functional group selected from a siloxy group, an isocyanate group, and an alkoxysilyl group in the one molecule.

16. A resinous composition for coating according to claim 1 wherein the content of the alkoxysilyl groups, as the vinyl monomers used that have the alkoxysilyl groups and as the compounds used that have the alkoxysilyl groups, in the composition correspond to 1 through 40% by weight of the whole solid content in the resinous composition.

17. A resinous composition for coating according to claim 1 wherein the content of the siloxy groups, as the vinyl monomers used that have the siloxy groups and as the compounds used that have the siloxy groups, in the composition is 5 through 60% by weight of the whole solid content in the resinous composition.

18. A resinous composition for coating according to claim 1, which has isocyanate and hydroxyl groups, wherein the equivalent ratio of the isocyanate groups to the hydroxyl groups in the composition is NCO/OH=0.5 through 2.0.

19. A resinous composition for coating according to claim 1 wherein (B) the catalyst for dissociating the siloxy group is 0.01 through 10% by weight of the solids content in the resinous composition.

20. A resinous composition for coating according to claim 1, further comprising a moisture-coupling agent that catches hold of moisture.

21. A surface coated with the resinous composition according to claim 1.

22. A metal base coated with a first coating of pigmented paint and as a top clear coating, the composition according to claim 1.

23. A resinous composition according to claim 1 wherein the catalyst (B) is selected from the group consisting of phosphoric acids and its acidic esters and phosphorous esters, sulfonic acids and their amine salts, and carboxylic acids and their salts.

24. A resinous compositions for coating according to claim 1, wherein the resinous mixture (A) and the catalyst (B) are stored in separate containers.

25. A method of forming a clear coating over a substrate to impart improved properties thereto comprising using the resinous composition according to claim 1 to form a clear coating on said substrate.

* * * * *